(12) United States Patent
Bennett et al.

(10) Patent No.: US 8,655,146 B2
(45) Date of Patent: Feb. 18, 2014

(54) COLLECTION AND CONCURRENT INTEGRATION OF SUPPLEMENTAL INFORMATION RELATED TO CURRENTLY PLAYING MEDIA

(75) Inventors: James D. Bennett, Hroznetin (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 371 days.

(21) Appl. No.: 12/696,394

(22) Filed: Jan. 29, 2010

(65) Prior Publication Data

US 2010/0247061 A1 Sep. 30, 2010

Related U.S. Application Data

(60) Provisional application No. 61/165,429, filed on Mar. 31, 2009.

(51) Int. Cl.
*H04N 9/80* (2006.01)
(52) U.S. Cl.
USPC .......................................................... 386/241
(58) Field of Classification Search
None
See application file for complete search history.

(56) References Cited

U.S. PATENT DOCUMENTS

| 6,282,713 | B1* | 8/2001 | Kitsukawa et al. | 725/36 |
|---|---|---|---|---|
| 7,620,551 | B2* | 11/2009 | Ho | 704/270 |
| 8,458,053 | B1* | 6/2013 | Buron et al. | 705/27.1 |
| 2003/0018971 | A1* | 1/2003 | McKenna, Jr. | 725/40 |
| 2007/0253678 | A1* | 11/2007 | Sarukkai | 386/95 |
| 2008/0036914 | A1* | 2/2008 | Russ et al. | 348/556 |
| 2008/0140523 | A1* | 6/2008 | Mahoney et al. | 705/14 |

\* cited by examiner

*Primary Examiner* — Huy T Nguyen
(74) *Attorney, Agent, or Firm* — Garlick & Markison; Bruce E. Stuckman (57) ABSTRACT

Collection and concurrent integration of supplemental information related to currently playing media. Based on certain characteristics associated with the media, additional information related thereto is identified and output along with the media itself. This provides an enhanced experience for a user, in that, this supplemental information augments the presentation of the media to the user. Such supplemental content can be any one or combination of a wide variety of types including textual information, image content, audio content, video content, etc. This supplemental content may be output automatically in conjunction with the media (e.g., when such media is being output). Alternatively, the supplemental content may be output upon the authorization of a user. The supplemental content may be output in a predetermined location (e.g., location within a video display). Alternatively, such supplemental content may be output within an unused (or infrequently used) area of such a video display.

21 Claims, 12 Drawing Sheets

Fig. 5B (top or bottom)

Fig. 5C (inset within media)

COLLECTION AND CONCURRENT INTEGRATION OF SUPPLEMENTAL INFORMATION RELATED TO CURRENTLY PLAYING MEDIA

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Application Ser. No. 61/165,429, entitled "Collection and concurrent integration of supplemental information related to currently playing media," filed Mar. 31, 2009.

BACKGROUND OF THE INVENTION

1. Technical Field of the Invention

The invention relates generally to devices operable to output media; and, more particularly, it relates to the management of supplemental content associated with such media.

2. Description of Related Art

The amount of media available for user consumption and enjoyment continues to grow a staggering rate. There seems to be an insatiable market for providing news, media, and information to users. Users continually seek such information via a variety of avenues. Nonetheless, there still does not exist an adequate means in the art by which a user can identify and enjoy such information in an efficient, coherent, and timely manner.

While many sources of information do in fact exist, it can be a cumbersome and time-consuming task even to find such information across such a broad range of sources. Also, once such information is identified (if it can be identified by a user), a user is left with an inability to integrate such information for a coherent media enjoyment experience, in that, such information is typically distributed across a number of platforms/devices.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

A novel means is presented herein by which any of a variety of types of supplemental content are identified and combined with media. The media itself can be analyzed to identify characteristics thereof, and using this identified information, supplemental content can be identified to augment the presentation of the media. For example, meta data is one type of characteristic of media that can be analyzed and used in the identification of supplemental content. The supplemental content may be of any variety of types, including textual content, image content, video content, and may correspond to ratings, news, opinions, etc. corresponding to the media. For one example, the media may be audio media, and the supplemental content may be targeted and related to the contributing artist who performed the song, or the supplemental content may be targeted and related to the production company that produced and/or marketed the song on behalf of the contributing artist, etc.

Such supplemental content may be viewed as being extra content related to the media that provides for an enhanced media enjoyment experience for a user. In addition, a device may also include a user interface to allow a user to add to and augment an existing database that includes such supplemental content by allowing for the submission of user-provided opinions, comments, ratings, etc.

There are a variety of types of devices that are operative to perform the management of supplemental content associated with such media to effectuate an improved user experience. Some examples of such devices are described below.

Figure 1A:
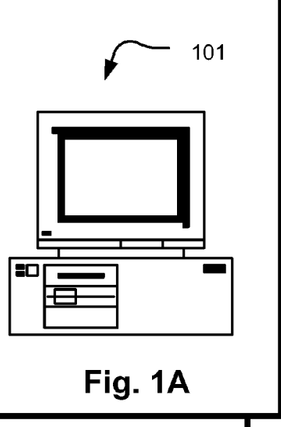
FIG. 1A illustrates an embodiment of a computer.

FIG. 1A illustrates an embodiment of a computer 101. The computer 101 can be a desktop computer, or an enterprise storage devices such a server, of a host computer that is attached to a storage array such as a redundant array of independent disks (RAID) array, storage router, edge router, storage switch and/or storage director. A user is able to view still digital images or video (e.g., a sequence of digital images) using the computer 101. Oftentimes, various image viewing capabilities and/or media player capabilities are included on a computer 101 to allow a user to view such images (including video). Also, certain embodiments of such a computer 101 can include one or more audio output devices (e.g., speakers either coupled to the computer 101 or integrated within the computer 101) to allow the outputting of audio content as well.

Figure 1B:
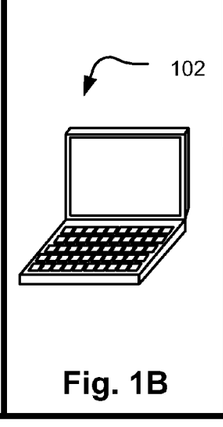
FIG. 1B illustrates an embodiment of a laptop computer.

FIG. 1B illustrates an embodiment of a laptop computer 102. Such a laptop computer 102 may be found and used in any of a wide variety of contexts. In recent years, with the ever-increasing processing capability and functionality found within laptop computers, they are being employed in many instances where previously higher-end and more capable desktop computers would be used. As with the computer 101, the laptop computer 102 may include various image viewing capabilities and/or media player capabilities to allow a user to view such images (including video). The laptop computer 102 may also include or be coupled to one or more audio output devices (e.g., speakers).

Figure 1C:
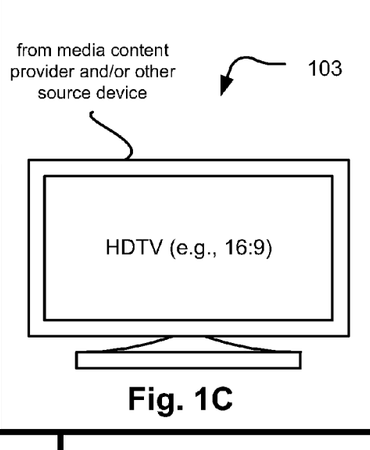
FIG. 1C illustrates an embodiment of a high definition (HD) television.

FIG. 1C illustrates an embodiment of a high definition (HD) television 103. Many HD televisions 103 include an integrated tuner to allow the receipt, processing, and decoding of media content (e.g., television broadcast signals) thereon. Alternatively, sometimes an HD television 103 receives media content from another source such as a digital video disc (DVD) player, set top box (STB) that receives, processes, and decodes a cable and/or satellite television broadcast signal (or alternatively, an over the air broadcast signal). Regardless of the particular implementation, the HD television 103 may be implemented to perform media processing as described herein. Generally speaking, an HD television 103 has capability to display HD media content and oftentimes is implemented having a 16:9 widescreen aspect ratio. Clearly, other aspect ratios other than merely 16:9 may be implemented within such an HD television 103. Such an HD television 103 typically will include integrated speakers. Also, such a HD television 103 may be implemented cooperatively with an external sound system that outputs audio content.

Figure 1D:
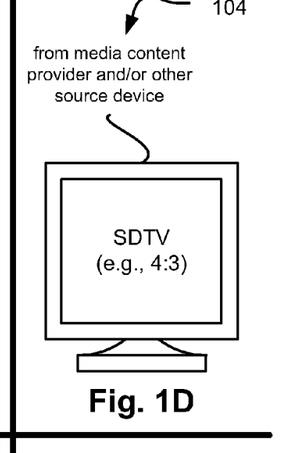
FIG. 1D illustrates an embodiment of a standard definition (SD) television.

FIG. 1D illustrates an embodiment of a standard definition (SD) television 104. Of course, an SD television 104 is somewhat analogous to an HD television 103, with at least one difference being that the SD television 104 does not include capability to display HD media content, and an SD television 104 oftentimes is implemented having a 4:3 full screen aspect ratio. Nonetheless, even an SD television 104 may be implemented to perform media processing as described herein. As mentioned above with respect to another television type, such an SD television 104 typically will include integrated speakers. Also, such a SD television 104 may be implemented cooperatively with an external sound system that outputs audio content.

Figure 1E:
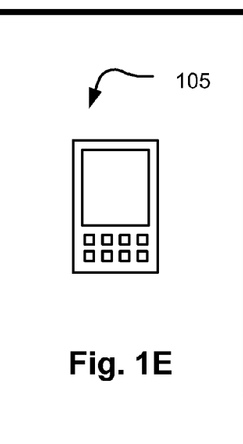
FIG. 1E illustrates an embodiment of a handheld media unit.

FIG. 1E illustrates an embodiment of a handheld media unit 105. A handheld media unit 105 may operate to provide general storage or storage of image/video content information such as joint photographic experts group (JPEG) files, tagged image file format (TIFF), bitmap, motion picture experts group (MPEG) files, Windows Media Architecture (WMA) files, other types of video content such as MPEG4 files, etc. for playback to a user, and/or any other type of information that may be stored in a digital format. Historically, such handheld media units were primarily employed for storage and playback of audio media; however, such a handheld media unit 105 may be employed for storage and playback of virtual any media (e.g., audio media, video media, photographic media, etc.). Moreover, such a handheld media unit 105 may also include other functionality such as integrated communication circuitry for wired and wireless communications. Such a handheld media unit 105 may be implemented to perform media processing as described herein.

Figure 1F:
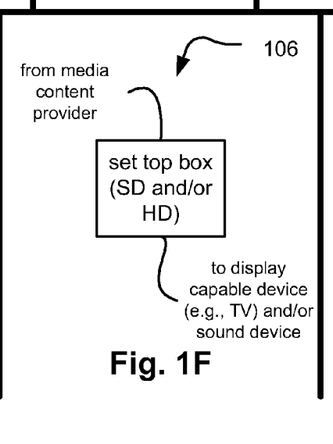
FIG. 1F illustrates an embodiment of a set top box (STB).

FIG. 1F illustrates an embodiment of a set top box (STB) 106. As mentioned above, sometimes a STB 106 may be implemented to receive, process, and decode a cable and/or satellite television broadcast signal to be provided to any appropriate display capable device such as SD television 104 and/or HD television 103. Such an STB 106 may operate independently or cooperatively with such a display capable device to perform media processing as described herein.

Figure 1G:
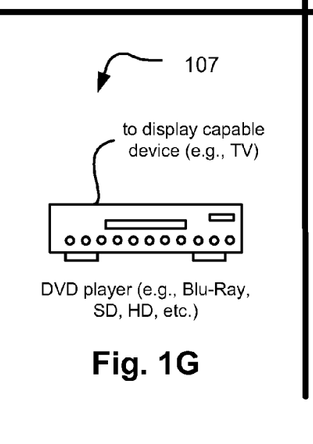
FIG. 1G illustrates an embodiment of a digital video disc (DVD) player.

FIG. 1G illustrates an embodiment of a digital video disc (DVD) player 107. Such a DVD player may be any one of a Blu-Ray DVD player, an HD capable DVD player, an SD capable DVD player, and an up-sampling capable DVD player (e.g., from SD to HD, etc.) without departing from the scope and spirit of the invention. The DVD player may provide a signal to any appropriate display capable device such as SD television 104 and/or HD television 103. The DVD player 105 may be implemented to perform media processing as described herein.

Figure 1H:
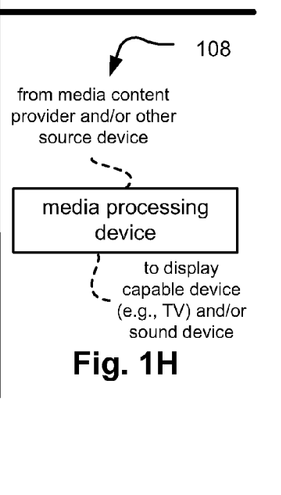
FIG. 1H illustrates an embodiment of a generic media processing device.

FIG. 1H illustrates an embodiment of a generic media processing device 108. Again, as mentioned above, these various devices described above do not include an exhaustive list of devices in which the media processing described herein may be effectuated, and it is noted that any generic digital media processing device 108 may be implemented to perform the media processing described herein without departing from the scope and spirit of the invention.

Figure 2:
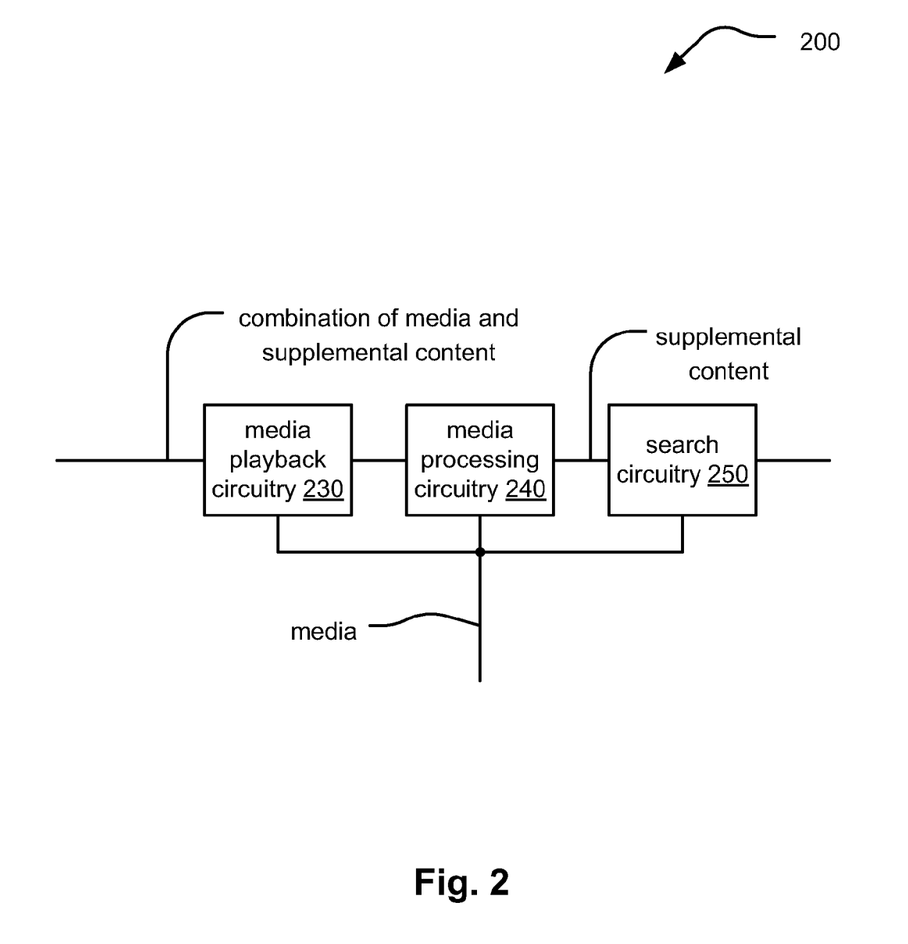
FIG. 2 illustrates an embodiment of an apparatus that is operative to output media and supplemental content related thereto.

FIG. 2 illustrates an embodiment of an apparatus 200 that is operative to output media and supplemental content related thereto. The apparatus 200 includes a media playback circuitry 230, a media processing circuitry 240, and a search circuitry 250. The media playback circuitry 230 is operative to output media having associated meta data and/or other characteristics associated therewith. Based on the meta data and/or other characteristics associated with the media, the search circuitry 250 is operative to identify supplemental content related to the media. The media processing circuitry 240 is operative to combine the supplemental content with the media. The media playback circuitry 230 then outputs the combination of supplemental content and media.

Depending on the granularity and overall content of the meta data and/or other characteristics associated with the media, various amounts of information related to the media can be gleaned. For example, with respect to audio media with audio media (e.g., such as that formatted in accordance with Motion Picture Expert Group-1 Audio Layer 3 (MP3) format, Windows Media Audio (WMA), or some other audio format), associated meta data can include information related any one or more of the contributing artist, the album, the date of production, the locale of production, the track number (e.g., on a CD), a bit rate, a length, etc. In the context of live recordings, information related to the locale, date, etc. associated with the live performance may also be included within such meta data.

Somewhat analogously, with respect to video files (e.g., such as those formatted in accordance with any of the various Motion Picture Expert Group (MPEG) formats (e.g., MPEG-1, MPEG-2, MPEG-3, MPEG-4), Windows Media Audio (WMA), or those formatted in accordance with some other video format), associated meta data can include information related to any one or more of the production company/studio, the actors and/or individuals included within the video media, the date of production, sites where filmed, etc.

Also, with respect to image files (e.g., such as those formatted in accordance with any of the various Joint Photographic Experts Group (JPEG) formats, Tagged Image File Format (TIFF), Bitmap file format (BMP), or some other image format), associated meta data can include information related to any one or more of the individuals and/or objects included within the image media, the date of image capture, camera settings (e.g., focal length, aperture, exposure, etc.), camera model, the site at which the image was captured, etc.

Moreover, for each of various types of media, various recognition and processing means can be employed to identify attributes of the media. For example, with respect to audio media, pattern recognition processing may be employed to identify a particular song, and that identification can be associated with the contributing artist. With respect to image (e.g., either still images or the image content included within the video media), various image processing means may be employed to identify individuals and/or objects within such images.

Regardless of precisely how characteristics associated with the media are ascertained (e.g., via the meta data of the media, via other processing means of the media to ascertain certain attributes of the media, etc.), these characteristics associated with the media are employed to identify supplemental content related to that media. The supplemental content related to the media may come in any of a variety of forms including textual information, image content, audio content, video content, etc. In addition, the supplemental content related to the media may come from any of a variety of sources. Different supplemental content may come from different sources.

Figure 3:
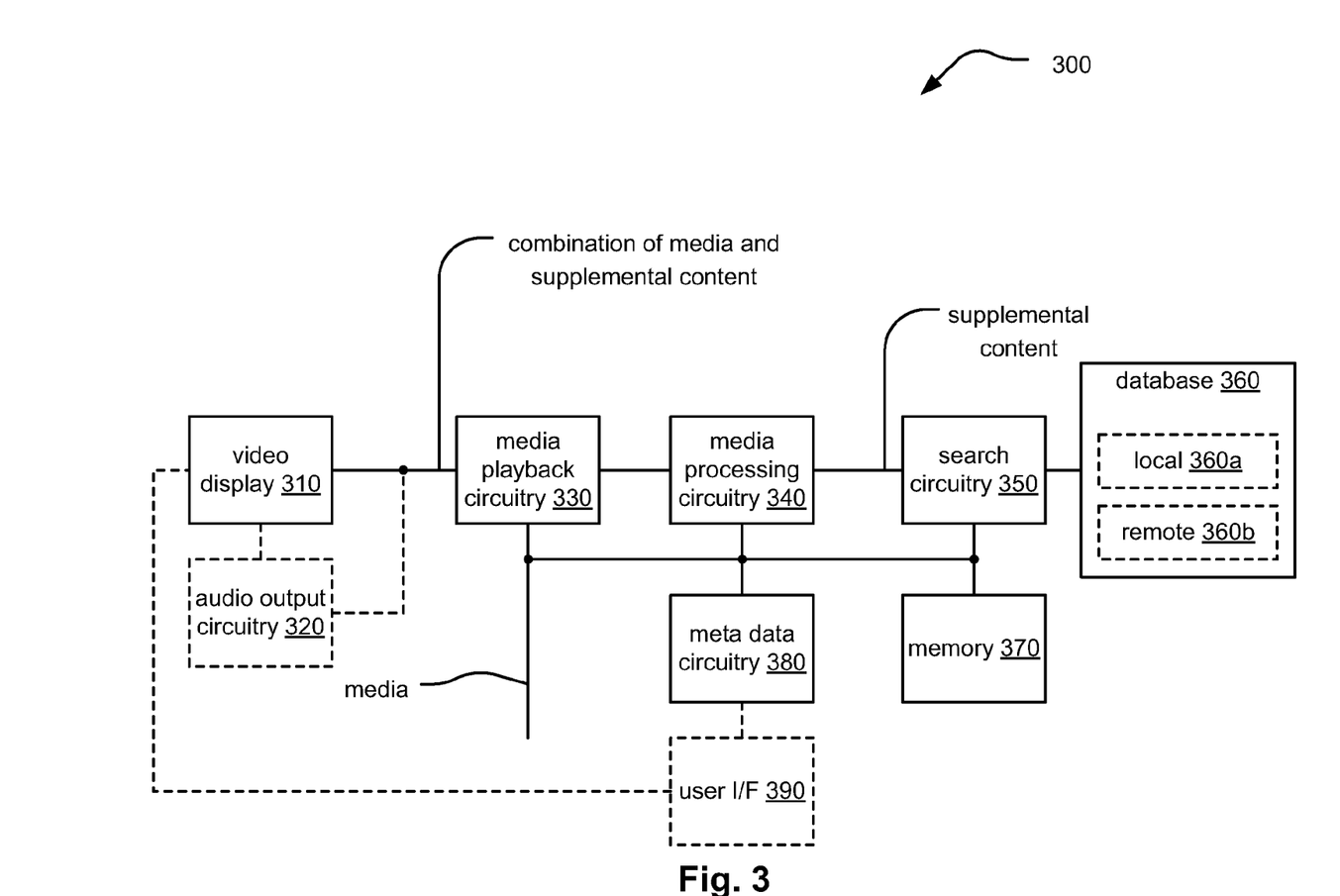
FIG. 3 and FIG. 4 illustrate alternative embodiments of apparatus that is operative to output media and supplemental content related thereto.
Figure 4:
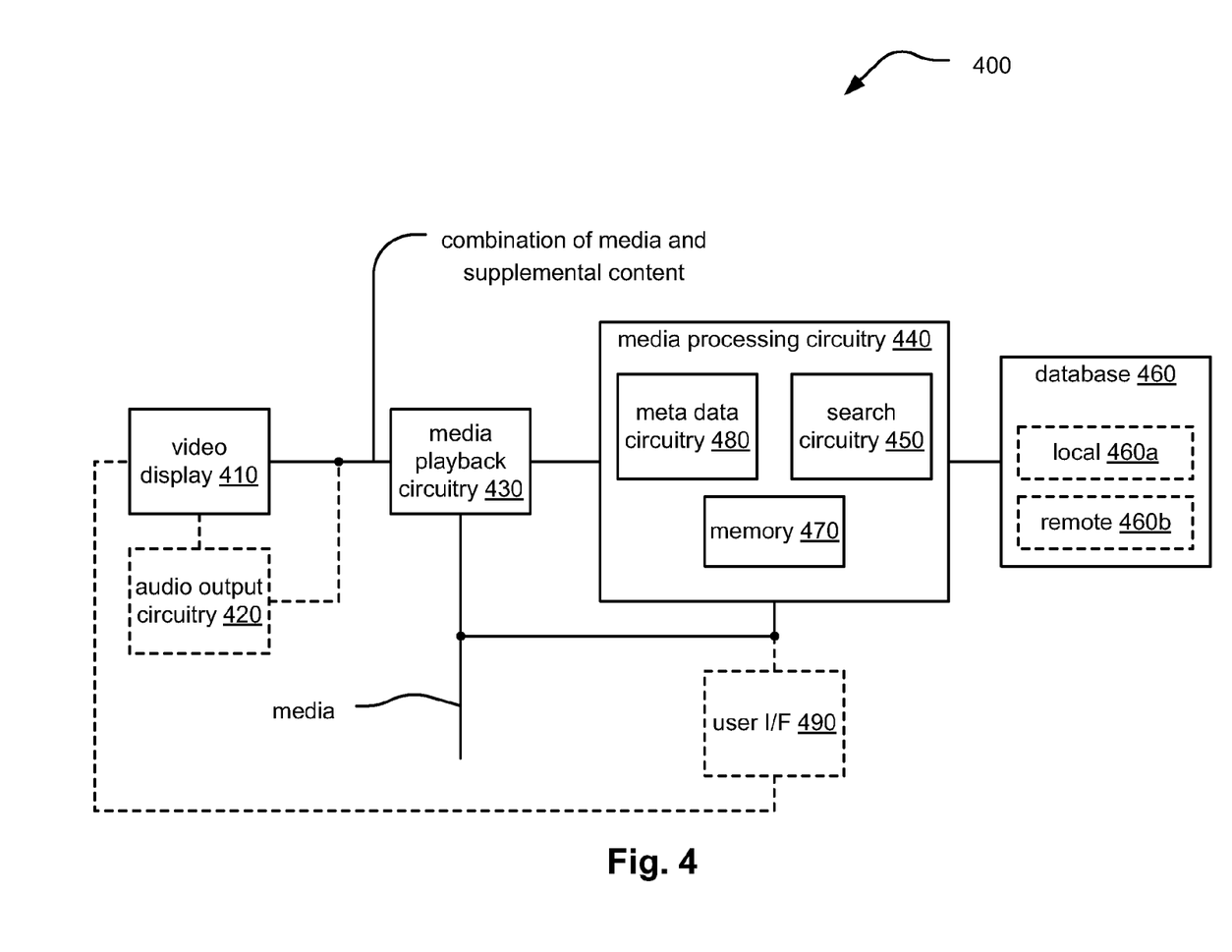

FIG. 3 and FIG. 4 illustrate alternative embodiments of apparatus that is operative to output media and supplemental content related thereto.

Referring to apparatus 300 of FIG. 3, the apparatus 300 includes a media playback circuitry 330, a media processing circuitry 340, a search circuitry 350, a memory circuitry 370, and a meta data circuitry 380.

The media playback circuitry 330 is coupled to a video display 310 that may include embedded or an integrated audio output circuitry or which may be coupled to an external audio output circuitry 320. A user interface 390 may also be implemented to receive information from and/or provide information to a user of the apparatus 300.

The media playback circuitry 330 is operative to output media having associated meta data and/or other characteristics associated therewith. Based on the meta data and/or other characteristics associated with the media, the search circuitry 350 is operative to identify first supplemental content related to the media. The media processing circuitry 340 is operative to combine the first supplemental content with the media. The media playback circuitry 330 may then, if desired, output the combination of the first supplemental content with the media to the video display 310 and/or the audio output circuitry 320.

Based on the first supplemental content, the meta data circuitry 380 is operative to modify the meta data and/or other characteristics associated with the media, thereby generating modified meta data and/or other modified characteristics associated with the media. This modified meta data and/or other modified characteristics associated with the media may then be stored in the memory circuitry 370.

Thereafter, based on the modified meta data and/or other modified characteristics associated with the media, the search circuitry 350 is operative to identify second supplemental content related to the media. The media processing circuitry 340 then combines the second supplemental content with the media, and the media playback circuitry 330 outputs the combination of first supplemental content and media or the combination of second supplemental content and media.

In this embodiment, the search circuitry 350 accesses a database 360, which could be a local database 360a or a remote database 360b or a number of different local and/or remote databases, to identify the first and/or second supplemental content.

Any of a wide variety of databases may be accesses to ascertain information related to media. For example, with respect to audio media, Apple, Inc.'s iTunes web site includes an enormous amount of information related to artists, musical groups, production companies, etc. With respect to video media, various web sites such as the Internet Movie Database (IMDb) web site, the Rotten Tomatoes web site, etc. include various supplemental content including reviews, ratings, news, and other information related to such video media. With respect to the Internet, there are a variety of news related web sites that may be accessed to provide news related supplemental content (e.g., CNN's web site, CNN's Headline News web site, Fox News web site, MSNBC News web site, etc.).

In addition to such publicly available sources of media and/or supplemental information, local databases (including user-owned and locally maintained databases such as may be stored on a user's computer, a user's external hard disk drive, a user's intranet, etc.) may be employed as well to store and include such media and/or supplemental content.

The user interface 390 may be implemented to receive user information related to any one or more of the media, the first supplemental information, and the second supplemental information. Based on this user information, the meta data circuitry 380 is operative to modify any one of the meta data and/or other characteristics associated with the media and the modified meta data. In addition, the user interface 390 may operate as a bi-directional communication link to the user, in that, additional information may be provided to the user via the user interface 390 such as solicitations requesting for user provided input such as ratings, opinions, commentary, etc.

Referring to apparatus 400 of FIG. 4, this embodiment is somewhat analogous to the previous embodiment, but a media processing circuitry 440 includes a meta data circuitry 480, a search circuitry 450, and a memory circuitry 470 integrated therein.

The apparatus 400 also includes a media playback circuitry 430, a video display 410, and the media processing circuitry 440 is operative to access a database 460 (being one or both of local 460a or remote 460b in nature). In some embodiments, an external audio output circuitry 420 is also coupled to the media playback circuitry 430 and a user interface 490 may also be implemented to facilitate interaction with a user. The embodiment of this diagram shows just one possible alternative of integration of various circuitries within an apparatus that is operative to output media and supplemental content related thereto. Clearly, other variations or degrees of integration of various circuitries may be employed in other embodiments.

Figure 5A:
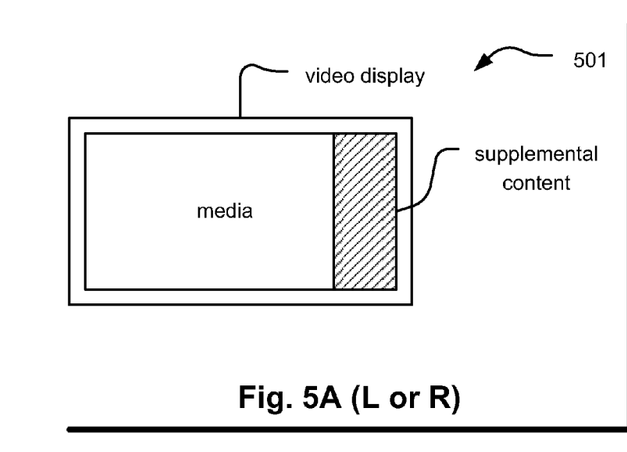
FIG. 5A, FIG. 5B, and FIG. 5C illustrate various embodiments of supplemental content emplacement within a video display.
Figure 5B:
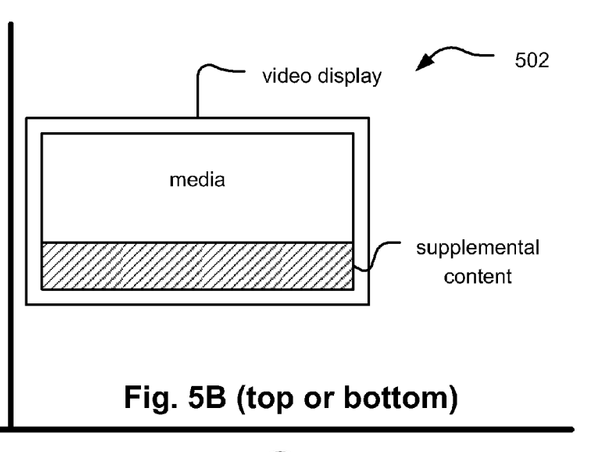
Figure 5C:
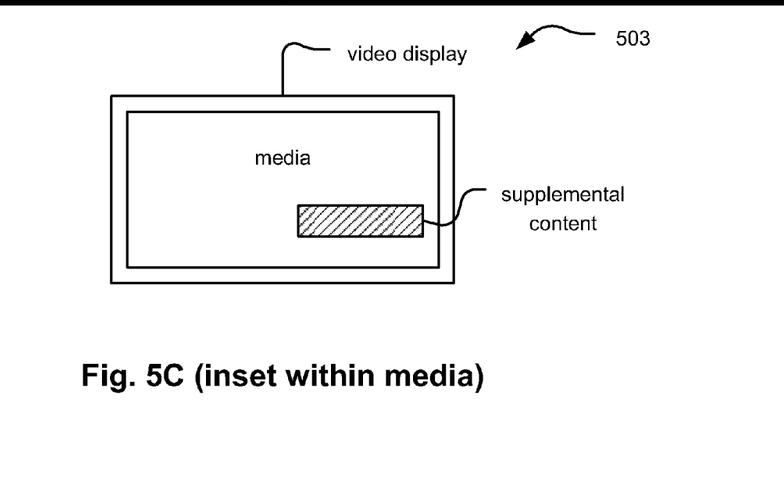

FIG. 5A, FIG. 5B, and FIG. 5C illustrate various embodiments of supplemental content emplacement within a video display.

Referring to apparatus 501 of FIG. 5A, the apparatus 501 includes a video display on which supplemental content is output on a side of the video display; this supplemental content may be displayed on the left or right hand side of the video display (or both sides).

Referring to apparatus 502 of FIG. 5B, the apparatus 501 includes a video display on which supplemental content is output on a bottom of the video display; this supplemental content may be displayed on the top or bottom of the video display (or both top and bottom).

Referring to apparatus 503 of FIG. 5C, the apparatus 501 includes a video display on which supplemental content is inset within the media that is displayed.

It is noted also that there are various means by which the supplemental content may be emplaced and presented in conjunction with the media. For example, a user may select (e.g., via a user interface) a preferred location in which the supplemental content is to be displayed. Alternatively, the location in which the supplemental content is presented may be adaptively determined based on the person or object within the media with which it is associated. For example, a news clip associated with an actor depicted within video media may be presented in relatively close proximity to the actor's location within the media (e.g., next to or below the actor).

In addition, the emplacement of the supplemental content may be adaptively determined based on the used region of a video display.

Figure 6:
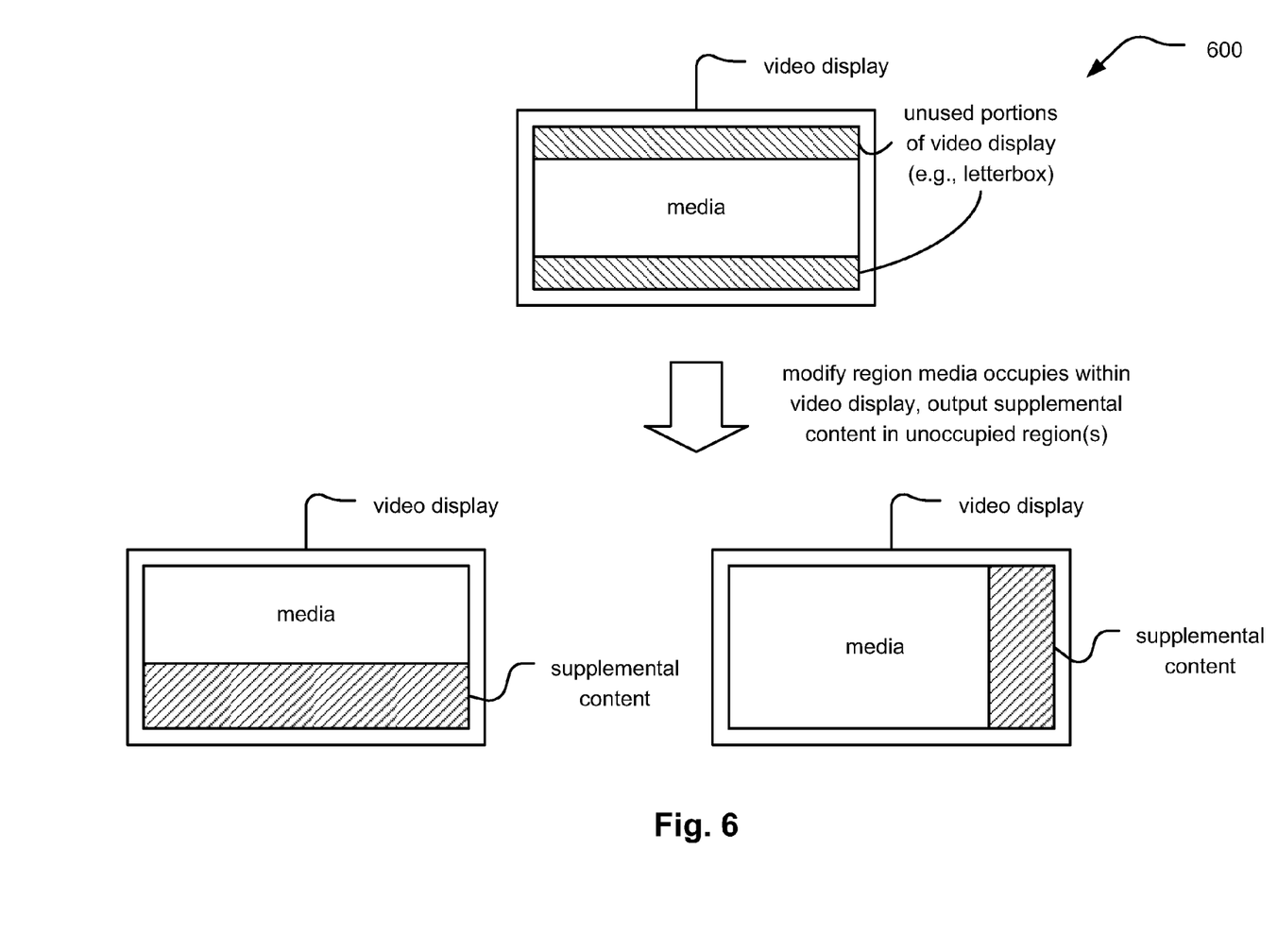
FIG. 6 illustrates an embodiment of modification of a display region of a video display and supplemental content emplacement within unused portions of the video display.

FIG. 6 illustrates an embodiment 600 of modification of a display region of a video display and supplemental content emplacement within unused portions of the video display. Video media may have various aspect ratios and formats (e.g., 4:3, 16:9, letterbox, etc.). Also, various video displays also come in various shapes having various aspect ratios (e.g., 4:3, 16:9, etc.). When the video media does not fully occupy the available display region of a video display, oftentimes the video media is modified (e.g., reformatted, stretched, cropped, shrunk, etc.) to fit appropriately within the video display.

For example, if video media having a 4:3 aspect ratio is displayed on a video display having a 16:9 aspect ratio, then there may be unused display regions of the video display (e.g., on right and left hand side in this case). As another example, if video media having a letterbox aspect ratio is displayed on a video display having a 16:9 aspect ratio or a 4:3 aspect ratio, then there may be unused display regions of the video display (e.g., on top and bottom hand side in this case).

The supplemental content associated with the media may be output in these unused video display regions. Alternatively, the region of the video display in which the media may be displayed may be modified (e.g., contracted, stretched, and/or simply moved up/down/left/right) to provide for the display region in which the supplemental content may be displayed. Of course, the location in which the supplemental content is displayed may be selected by or modified by a user (e.g., via a user interface as well).

Figure 7:
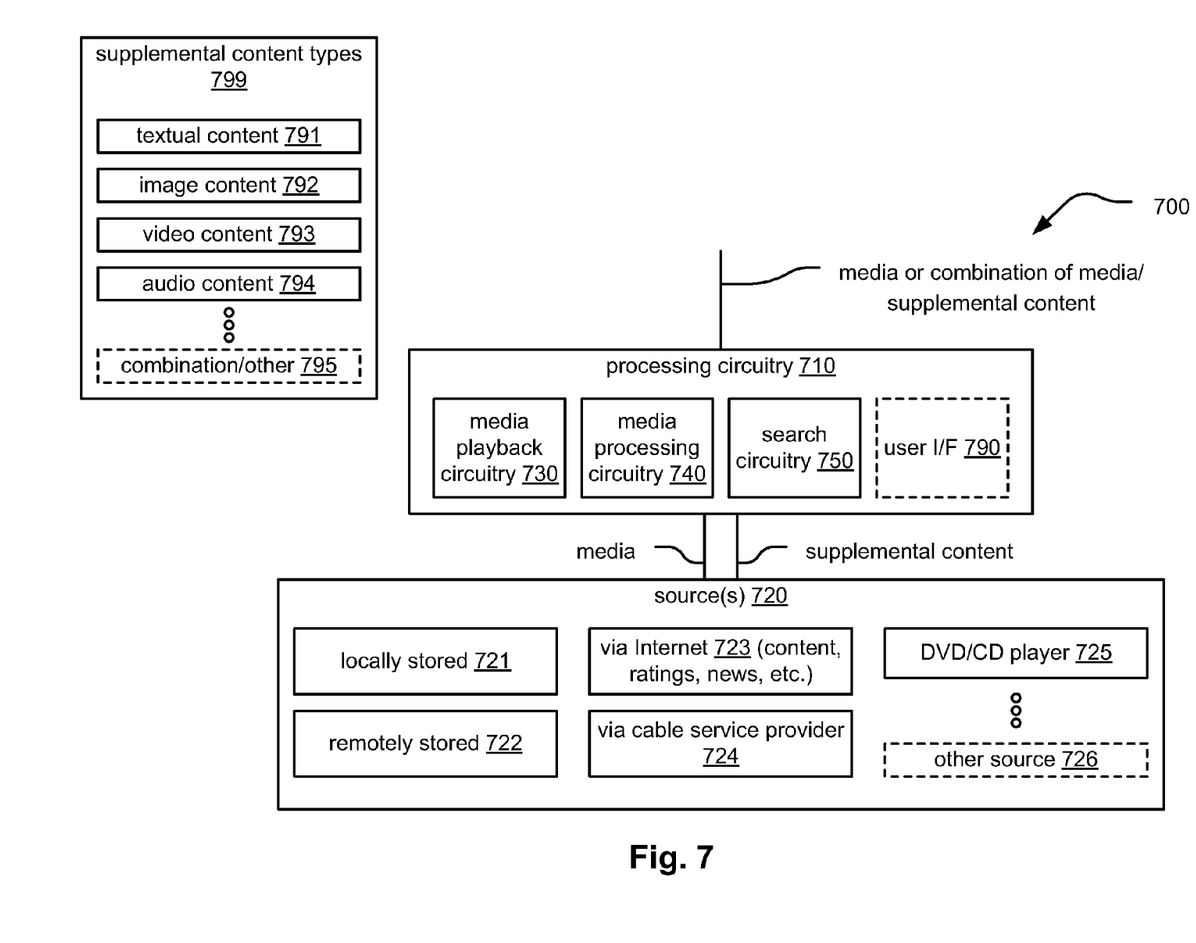
FIG. 7 illustrates an embodiment of various sources from which media and/or supplemental content may be provided as well as various supplemental content types.

FIG. 7 illustrates an embodiment 700 of various sources from which media and/or supplemental content may be provided as well as various supplemental content types. A processing circuitry 710 includes a media playback circuitry 730, a media processing circuitry 740, and a search circuitry 750 therein. In some embodiments, the processing circuitry 710 also includes a user interface 790 as well.

There is a variety of sources 720 from which either one or both of the media and supplemental content may be provided. For example, they may be locally stored 721, remotely stored 722 (e.g., and accessible via some network connection), provided via the Internet 723 (e.g., from some content, ratings, and/or news related site, etc.), provided via a cable service provider 724 (or some other media service provider), from a DVD and/or CD player 725, and/or any other source.

There are a variety of types of forms that the supplemental content may take, as indicated by reference numeral 799, textual content 791, image content 792, video content 793, audio content 794, and/or any other form or any combination thereof 795.

Figure 8:
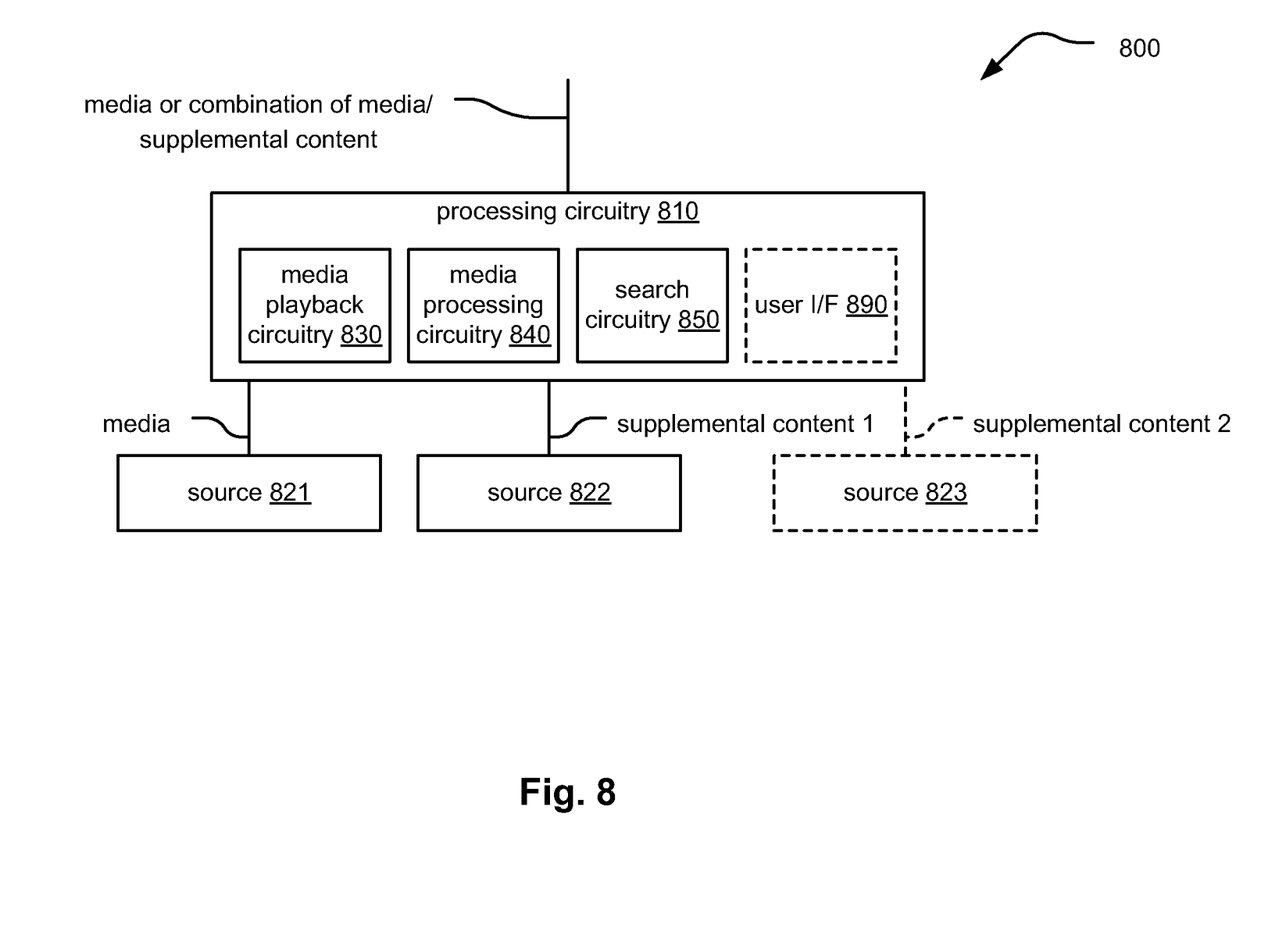
FIG. 8 illustrates an alternative embodiment of an apparatus that is operative to output media (provided from a first source) and supplemental content (provided from a second source).

FIG. 8 illustrates an alternative embodiment of an apparatus that is operative to output media (provided from a first source) and supplemental content (provided from a second source).

A processing circuitry 810 includes a media playback circuitry 830, a media processing circuitry 840, and a search circuitry 850 therein. In some embodiments, the processing circuitry 810 also includes a user interface 890 as well.

It is noted that each of the media and supplemental content need not be provided from a common source. For example, the media may be provided from one source 821, and the supplemental content may be provided from another source 822. In addition, first supplemental content may be provided from a first supplemental source 822, and second supplemental content may be provided from a second supplemental source 823. Also, during subsequent playbacks of the media, additional searching may be performed in the same or different supplemental source(s).

Figure 9:
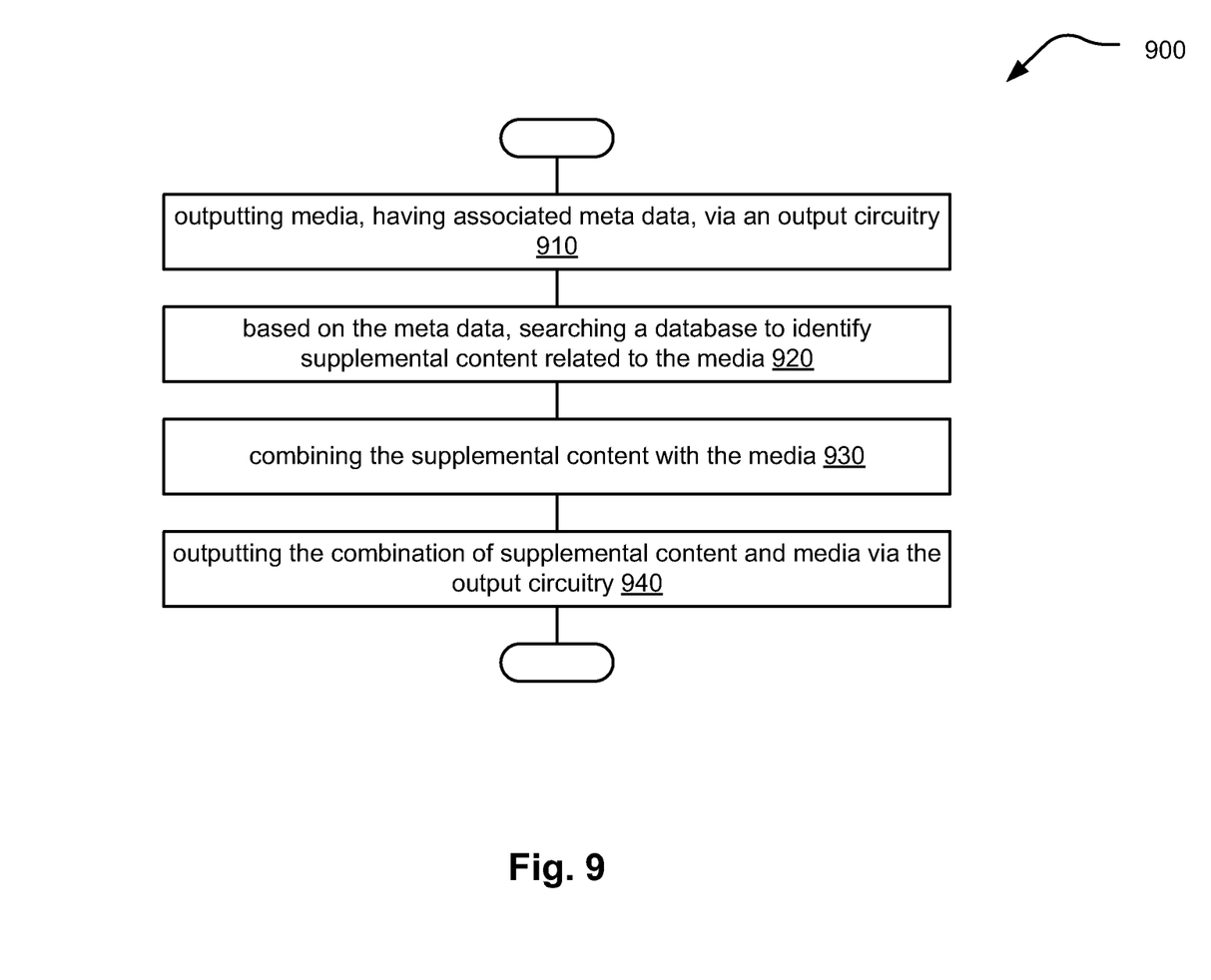
FIG. 9 illustrates an embodiment of a method for outputting media and supplemental content related thereto.

FIG. 9 illustrates an embodiment of a method 900 for outputting media and supplemental content related thereto. The method 900 begins by outputting media, having associated meta data, via an output circuitry, as shown in a block 910.

The method 900 continues searching a database to identify supplemental content related to the media, as shown in a block 920. This searching is narrowed and targeted based on the meta data of the media. In addition, other characteristics besides only meta data may be employed to assist in the searching of the database to identify at least one type of supplemental content. The method 900 continues by combining the supplemental content with the media, as shown in a block 930, and the method 900 then operates by outputting the combination of supplemental content and media via the output circuitry, as shown in a block 940.

FIGS. 10A, 10B, 11A, 11B, 12A, and 12B illustrate alternative embodiments of methods for outputting media and supplemental content related thereto.

Figure 10A:
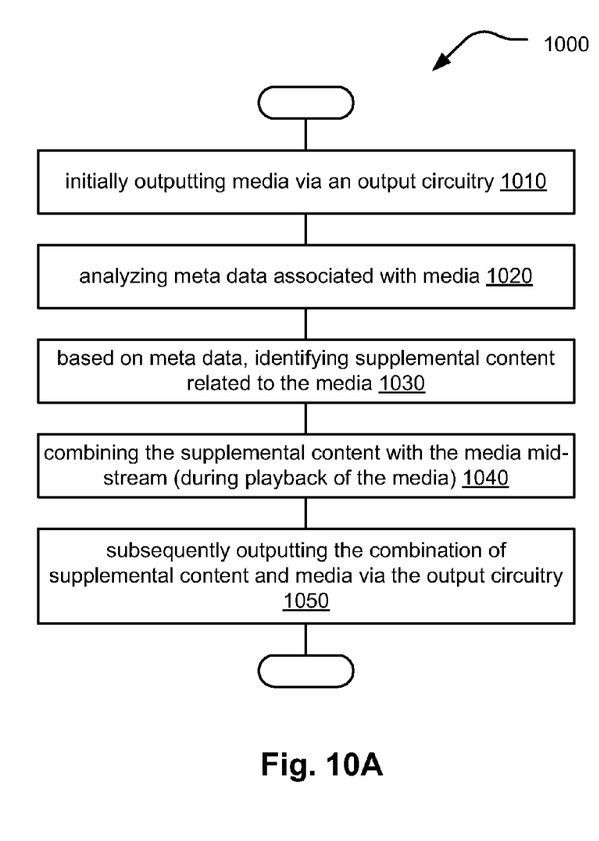
FIGS. 10A, 10B, 11A, 11B, 12A, and 12B illustrate alternative embodiments of methods for outputting media and supplemental content related thereto.

Referring to method 1000 of FIG. 10A, the method 1000 begins by initially outputting media via an output circuitry, as shown in a block 1010. The method 1000 continues by analyzing meta data associated with media, as shown in a block 1020. Based on meta data, the method 1000 then operates by identifying supplemental content related to the media, as shown in a block 1030. The method 1000 then continues by combining the supplemental content with the media midstream (i.e., during the playback of the media), as shown in a block 1040. In other words, the media initially is output via the output circuitry, and the media also undergoes analysis to assist in the identification of such supplemental content. Sometime during playback (e.g., mid-stream during the playback of the media), the supplemental content is added to the output to augment the playback of the media. As such, the method 1000 continues by subsequently outputting the combination of supplemental content and media via the output circuitry, as shown in a block 1050.

Figure 10B:
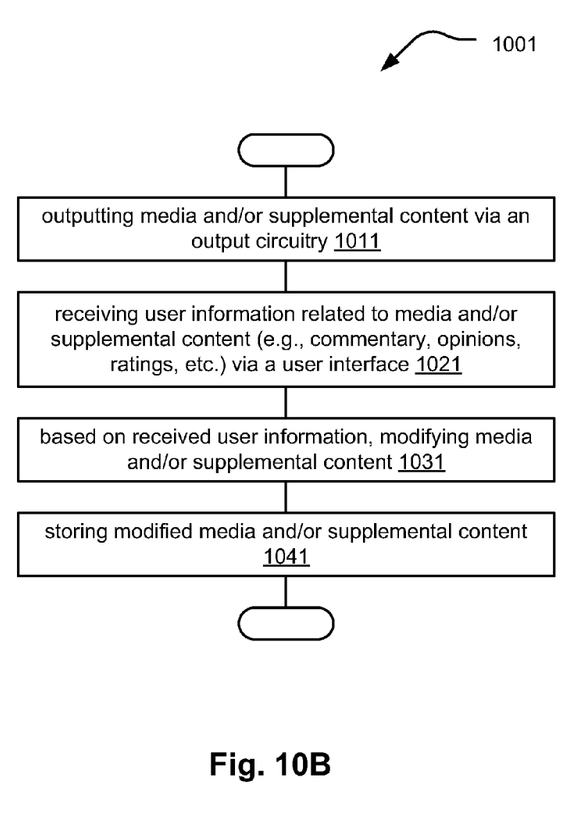

Referring to method 1001 of FIG. 10B, the method 1001 begins by outputting media and/or supplemental content via an output circuitry, as shown in a block 1011. The method 1001 continues by receiving user information related to media and/or supplemental content (e.g., commentary, opinions, ratings, etc.) via a user interface, as shown in a block 1021.

Based on received user information, the method 1001 continues by modifying media and/or supplemental content, as shown in a block 1031. The method 1001 then operates by storing modified media and/or supplemental content, as shown in a block 1041.

Figure 11A:
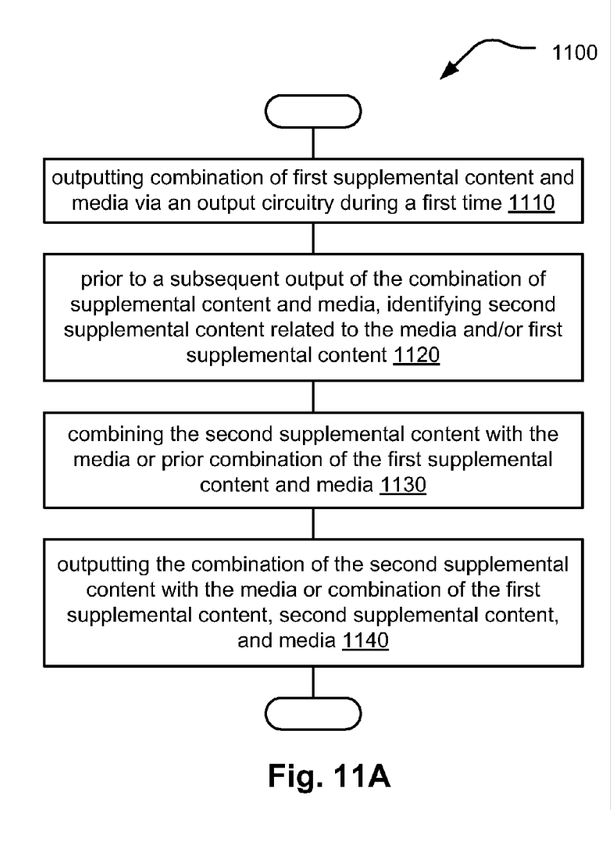

Referring to method 1100 of FIG. 11A, the method 1100 begins by outputting combination of first supplemental content and media via an output circuitry during a first time, as shown in a block 1110. Prior to a subsequent output of the combination of supplemental content and media, the method 1100 operates by identifying second supplemental content related to the media and/or first supplemental content, as shown in a block 1120.

The method 1100 then continues by combining the second supplemental content with the media or prior combination of the first supplemental content and media, as shown in a block 1130. The method 1100 proceeds by outputting the combination of the second supplemental content with the media or combination of the first supplemental content, second supplemental content, and media, as shown in a block 1140.

Figure 11B:
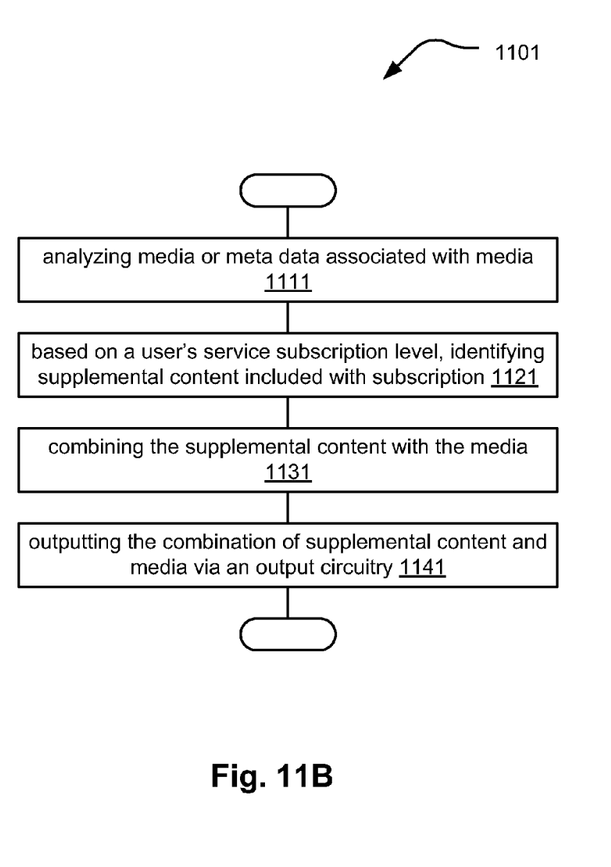

Referring to method 1101 of FIG. 11B, the method 1101 begins by analyzing media or meta data associated with media, as shown in a block 1111. Based on a user's service subscription level, the method 1101 continues by identifying supplemental content included with subscription, as shown in a block 1121. Various grades/levels/tiers of subscription can offer access to different types of supplemental content.

The method 1101 continues by combining the supplemental content with the media, as shown in a block 1131. The method 1101 continues by outputting the combination of supplemental content and media via an output circuitry, as shown in a block 1141.

Figure 12A:
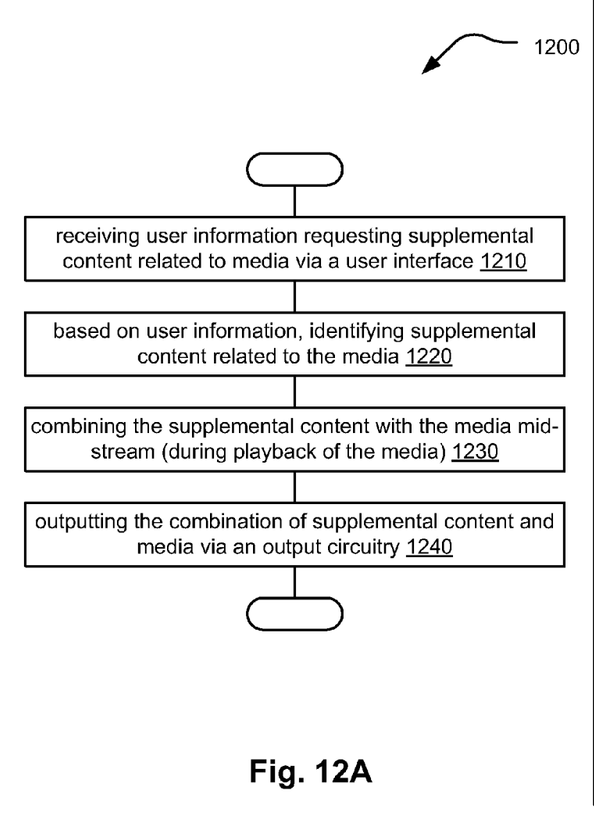

Referring to method 1200 of FIG. 12A, the method 1200 begins by receiving user information requesting supplemental content related to media via a user interface, as shown in a block 1210. Based on user information, the method 1200 continues by identifying supplemental content related to the media, as shown in a block 1220.

The method 1200 then operates by combining the supplemental content with the media mid-stream (during playback of the media), as shown in a block 1230. The method 1200 proceeds by outputting the combination of supplemental content and media via an output circuitry, as shown in a block 1240.

Figure 12B:
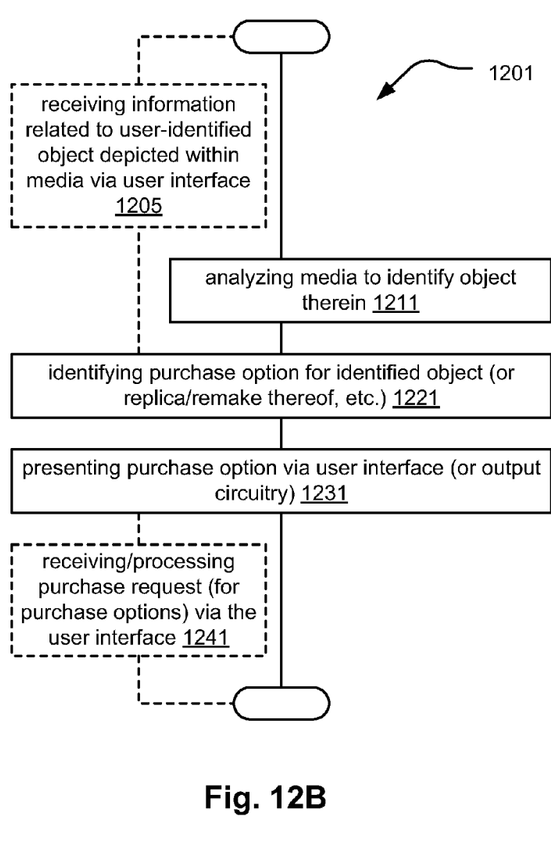

Referring to method 1201 of FIG. 12B, the method 1201 begins by analyzing media to identify object therein, as shown in a block 1211. In an alternative embodiment, the method 1200 instead operates by receiving information related to user-identified object depicted within media via user interface, as shown in a block 1205 instead of performing the operations in block 1211.

The method 1201 continues by identifying purchase option for identified object (or replica/remake thereof, etc.), as shown in a block 1221. For example, the purchase option may include not only presenting the purchasable option for the identified object to a user, but also by providing additional related to the identified object (e.g., such a jacket was worn by a performer during a concert in a particular locale on a particular date, etc.). The method 1201 continues by presenting purchase option via user interface (or output circuitry), as shown in a block 1231.

In some embodiments, the method 1201 also continues by receiving/processing purchase request (for purchase options) via the user interface, as shown in a block 1241.

It is noted that the various circuitries and/or modules (e.g., media playback modules or circuitries, media processing modules or circuitries, search modules or circuitries, meta data modules or circuitries, memory modules or circuitries, processing modules or circuitries, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory, random access memory, volatile memory, non-volatile memory, static memory, dynamic memory, flash memory, and/or any device that stores digital information. It is also noted that when the processing circuitry implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing circuitry coupled thereto executes, operational instructions corresponding to at least some of the steps and/or functions illustrated and/or described herein.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. An apparatus, comprising:
a memory circuitry;
a media playback circuitry that is operative to output media having associated meta data;
a search circuitry that, based on the meta data, is operative to identify first supplemental content related to the media via an Internet search of at least one remote server;

a media processing circuitry that is operative to combine the first supplemental content with the media; and a meta data circuitry that is operative to modify the meta data, based on the first supplemental content, thereby generating modified meta data; and wherein:

the modified meta data is stored in the memory circuitry;

the search circuitry, based on the modified meta data, is operative to identify second supplemental content related to the media;

the media processing circuitry combines the second supplemental content with the media; and the media playback circuitry outputs the combination of first supplemental content and media or the combination of second supplemental content and media;

the media includes video media;

at least one of the first supplemental content and the second supplemental content includes at least one of textual content, image content, and video content;

at least one of the combination of first supplemental content and media and the combination of second supplemental content and media is output via a video display the video media occupies a first separate portion of the video display; and at least one of the first supplemental content and the second supplemental content occupies a second separate portion of the video display.

2. The apparatus of claim 1, wherein:
at least one of the memory circuitry, the media playback circuitry, the search circuitry, the media processing circuitry, and the meta data circuitry is included within a computer, a laptop computer, a handheld media unit, a set top box (STB), or a digital video disc (DVD) player.

3. The apparatus of claim 1, wherein:
the first separate portion of the video display and the second separate portion of the video display compose an entirety of the video display.

4. The apparatus of claim 1, wherein:
the video display is a computer, a laptop computer, a high definition (HD) television, a standard definition (SD) television, or a handheld media unit.

5. The apparatus of claim 1, wherein:
the media playback circuitry modifies the first separate portion of the video display thereby generating the second separate portion of the video display.

6. The apparatus of claim 1, further comprising:
an audio output circuitry coupled to the media playback circuitry; and wherein:
the media includes audio media that is output via the audio output circuitry; and
at least one of the first supplemental content and the second supplemental content includes at least one of textual content, image content, and video content that is output via the video display while the audio media is output via the audio output circuitry.

7. The apparatus of claim 1, wherein:
the search circuitry searches a local database to identify at least one of the first supplemental content and the second supplemental content; and
the search circuitry retrieves at least one of the first supplemental content and the second supplemental content from the local database.

8. The apparatus of claim 1, wherein:
when the media playback circuitry outputs the media during a subsequent playback, the search circuitry is operative to identify third supplemental content related to the media based on the modified meta data.

9. The apparatus of claim 1, wherein:
the meta data circuitry is operative to analyze the media to generate the meta data or the modified meta data.

10. The apparatus of claim 1, further comprising:
user interface implemented to receive user information related to at least one of the media, the first supplemental information, and the second supplemental information; and
a meta data circuitry that is operative to modify at least one of the meta data and the modified meta data based on the user information related to at least one of the media, the first supplemental information, and the second supplemental information.

11. An apparatus, comprising:
a media playback circuitry that is operative to output media having associated meta data;

a search circuitry that, based on the meta data, is operative to identify first supplemental content related to the media via an Internet search of at least one remote server;

a media processing circuitry that is operative to combine the first supplemental content with the media; and a meta data circuitry that is operative to modify the meta data, based on the first supplemental content, thereby generating modified meta data; and wherein:

the modified meta data is stored in a memory circuitry;

the search circuitry, based on the modified meta data, is operative to identify second supplemental content related to the media;

the media processing circuitry combines the second supplemental content with the media; and the media playback circuitry outputs the combination of first supplemental content and media or the combination of second supplemental content and media;

the media includes video media;

at least one of the first supplemental content and the second supplemental content includes at least one of textual content, image content, and video content;

at least one of the combination of first supplemental content and media and the combination of second supplemental content and media is output via a video display the video media occupies a first separate portion of the video display; and at least one of the first supplemental content and the second supplemental content occupies a second separate portion of the video display.

12. The apparatus of claim 11, wherein:
at least one of the memory circuitry, the media playback circuitry, the search circuitry, the media processing circuitry, and the meta data circuitry is included within a computer, a laptop computer, a handheld media unit, a set top box (STB), or a digital video disc (DVD) player.

13. The apparatus of claim 11, wherein:
the first separate portion of the video display and the second separate portion of the video display compose an entirety of the video display.

14. The apparatus of claim 11, wherein:
the video display is a computer, a laptop computer, a high definition (HD) television, a standard definition (SD) television, or a handheld media unit.

15. The apparatus of claim 11, wherein:
the media playback circuitry modifies the first separate portion of the video display thereby generating the second separate portion of the video display.

16. The apparatus of claim 11, further comprising:
an audio output circuitry coupled to the media playback circuitry; and wherein:
the media includes audio media that is output via the audio output circuitry; and
at least one of the first supplemental content and the second supplemental content includes at least one of textual content, image content, and video content that is output via the video display while the audio media is output via the audio output circuitry.

17. The apparatus of claim 11, wherein:
the search circuitry searches a local database to identify at least one of the first supplemental content and the second supplemental content; and
the search circuitry retrieves at least one of the first supplemental content and the second supplemental content from the local database.

18. The apparatus of claim 11, wherein:
when the media playback circuitry outputs the media during a subsequent playback, the search circuitry is operative to identify third supplemental content related to the media based on the modified meta data.

19. The apparatus of claim 11, wherein:
the meta data circuitry is operative to analyze the media to generate the meta data or the modified meta data.

20. The apparatus of claim 11, further comprising:
user interface implemented to receive user information related to at least one of the media, the first supplemental information, and the second supplemental information; and
a meta data circuitry that is operative to modify at least one of the meta data and the modified meta data based on the user information related to at least one of the media, the first supplemental information, and the second supplemental information.

21. A method comprising:
operating circuitry in conjunction with a memory to perform the following:
outputting media having associated meta data;
identifying, based on the meta data, first supplemental content related to the media via an Internet search of at least one remote server;
combining the first supplemental content with the media; and
modifying the meta data, based on the first supplemental content, thereby generating modified meta data; and wherein:
storing modified meta data in the memory;
identifying, based on the modified meta data, second supplemental content related to the media;
combining the second supplemental content with the media; and
outputting the combination of first supplemental content and media or the combination of second supplemental content and media;
wherein the media includes video media;
wherein at least one of the first supplemental content and the second supplemental content includes at least one of textual content, image content, and video content;
wherein at least one of the combination of first supplemental content and media and the combination of second supplemental content and media is output via a video display;
wherein the video media occupies a first separate portion of the video display; and
wherein at least one of the first supplemental content and the second supplemental content occupies a second separate portion of the video display.

* * * * *